Aug. 12, 1952                   G. PITZL                   2,606,894
PREPARATION OF ORGANIC SOLVENT-SOLUBLE VINYLIDENE
CHLORIDE-ACRYLONITRILE INTERPOLYMERS
Filed Nov. 4, 1947
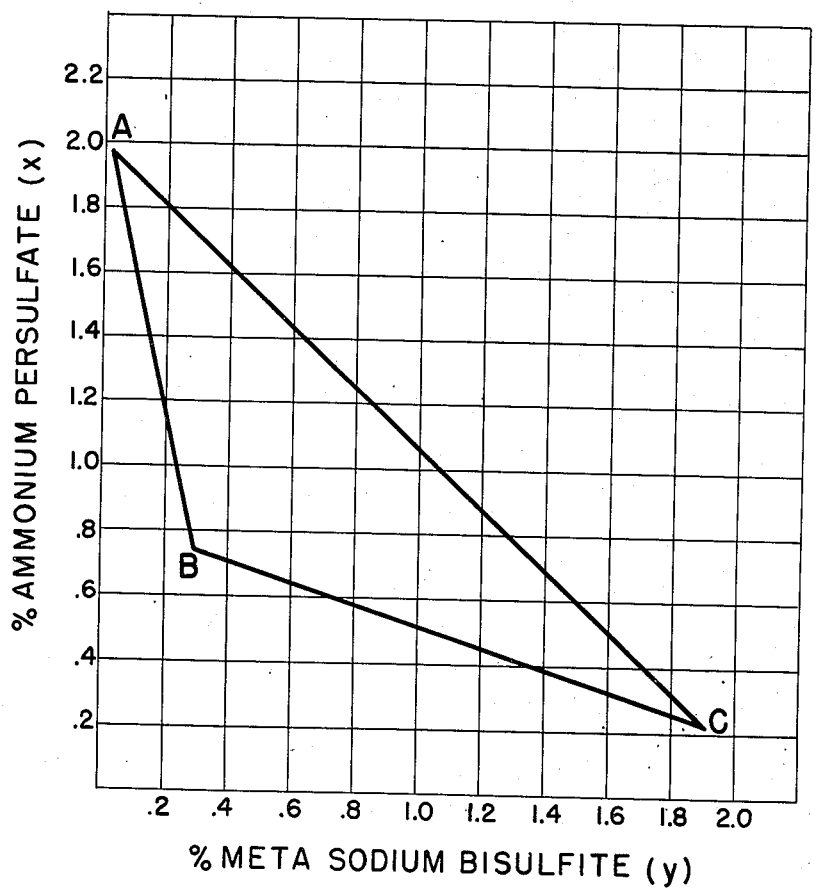
INVENTOR.
GILBERT PITZL
BY
ATTORNEY Patented Aug. 12, 1952

2,606,894

UNITED STATES PATENT OFFICE 2,606,894

PREPARATION OF ORGANIC SOLVENT-SOLUBLE VINYLIDENE CHLORIDE-ACRYLONITRILE INTERPOLYMERS

Gilbert Pitzl, Buffalo, N. Y., assignor to E. I. du Pont de Nemours & Company, Wilmington, Del., a corporation of Delaware Application November 4, 1947, Serial No. 783,968

2 Claims. (Cl. 260—85.5)

This invention relates to the manufacture of vinylidene chloride polymers. More particularly, it relates to an organic solvent-soluble vinylidene chloride-acrylonitrile interpolymer containing at least 90% vinylidene chloride, and to an improved process for producing the same.

The coating from solution of flexible, transparent, regenerated cellulose film, ethyl cellulose film, polyvinyl alcohol film and the like with suitable coating compositions for the purpose of rendering the film moisture-resistant, heat-sealable and otherwise improving the properties thereof is well-known. Because they are tough, flexible, strong, transparent, heat-sealable, and moisture-resistant, coatings of vinylidene chloride/acrylonitrile interpolymers particularly recommend themselves for this purpose. However, maximum moistureproofness is achieved only with those interpolymers having very high vinylidene chloride concentration, that is, in excess of 80% by weight. Unfortunately, interpolymers wherein the weight ratio of vinylidene chloride to acrylonitrile is greater than 4 to 1, as prepared heretofore, are not sufficiently soluble in the common volatile organic solvents to be applied from solution using existing equipment. Hence, it has not been feasible to take full advantage of the superior properties of these resins in the coating of regenerated cellulose film and like water-sensitive cellulosic structures.

An object of this invention, therefore, is to prepare an organic solvent-soluble vinylidene chloride-acrylonitrile interpolymer having excellent moistureproofness and coating characteristics. Another object is to provide a process for interpolymerizing vinylidene chloride and acrylonitrile to produce a stable interpolymer soluble in a commercially suitable volatile organic solvent and having excellent moistureproofness when used in the form of a protective coating for transparent regenerated cellulose film and the like. A more specific object is to provide a highly moistureproof vinylidene-chloride interpolymer containing more than 90% vinylidene chloride and soluble in methyl ethyl ketone. These and other objects will more clearly appear hereinafter.

Unexpectedly it has been found that if instead of reacting a vinylidene chloride-acrylonitrile mixture containing a high proportion of vinylidene chloride (e. g., 90%) in the presence of ammonium persulfate as catalyst and meta sodium bisulfite as activator to obtain the highest possible conversion yield, the reaction is cut off at any point within the range of from 55% to 70% conversion yield there is obtained a vinylidene chloride-acrylonitrile interpolymer having a high ratio of vinylidene chloride to acrylonitrile which polymer is soluble in hot (70° C.) methyl ethyl ketone, and which has excellent moistureproofing qualities when applied to films of regenerated cellulose, polyvinyl alcohol and the like. It has also been found that the reaction of a mixture containing 90% vinylidene chloride and 10% acrylonitrile may be made to easily cut off at a conversion yield within the critical range of 55–70% by carrying out the reaction under critical conditions hereinafter specified.

Accordingly, the present invention comprises preparing an organic solvent-soluble, highly moistureproof interpolymer of vinylidene chloride and acrylonitrile by reacting a mixture of vinylidene chloride and acrylonitrile in the weight ratio of 90:10 in aqueous emulsion at a temperature of from 33–35° C., and in the presence of sulfated methyl oleate as emulsifying agent, ammonium persulfate as catalyst and meta sodium bisulfite as activator, the relative percentages by weight of catalyst and activator, based on the weight of vinylidene chloride and acrylonitrile monomers used, being maintained within critical limits defined by the triangle of Fig. 1 wherein the per cent of ammonium persulfate ($x$) used in the reaction and under the conditions hereinabove specified, based on the weight of vinylidene chloride and acrylonitrile monomers used, is plotted against the per cent meta sodium bisulfite ($y$) used and the triangle is defined by the points A (1.98% ammonium persulfate and 0.03% metal sodium bisulfite), B (0.74% ammonium persulfate and 0.28% meta sodium bisulfite) and C (0.23% ammonium persulfate and 1.92% meta sodium bisulfite).

To obtain a conversion yield of polymer between 55% and 70%, it is essential that the point $xy$ in each instance fall within the triangle ABC of Fig. 1. If $xy$ falls outside triangle ABC the conversion yield of copolymer will be either below 55% or above 70%, and the polymer obtained will be either insufficiently moistureproof or insoluble in volatile organic solvents and hence not suitable for use as a moistureproof coating for regenerated cellulose film and the like.

The following example of a preferred embodiment is illustrative of the practice of this invention. Parts and percentages are by weight unless otherwise indicated:

*Example*

The following charge is placed in a vessel equipped with a thermometer, stirrer and reflux condenser.

775 parts H₂O
3.2 parts ammonium persulfate
16 parts sulfated methyl oleate
20 parts acrylonitrile
180 parts vinylidene chloride The above charge is heated to 33° C. under atmospheric reflux and stirring, and 0.64 part of meta sodium bisulfite in 25 parts of water is added. A reaction temperature of 33° C. is maintained for 5½–6 hours, after which time no appreciable further conversion occurs. The emulsion is then drawn off, coagulated with aluminum sulfate and the polymer purified. These conditions will produce a 92/8 vinylidene chloride/acrylonitrile polymer in yields from 60–65%. The purified polymer in film form has a permeability value [1] of 5 for a 1 mil film and is soluble in hot (70° C.) methyl ethyl ketone to the extent of 25 parts of polymer to 75 parts of solvent.

This high vinylidene chloride content interpolymer, when applied onto a base film of softened regenerated cellulose, gives an excellent moisture-resistant, heat-sealable, durable, flexible, transparent coating.

It is apparent from the foregoing that the present invention enables the preparation of a vinylidene chloride-acrylonitrile interpolymer containing at least 90% vinylidene chloride, which interpolymer is, by reason of its solubility in methyl ethyl ketone, readily applicable as a protective, moisture-resistant coating on regenerated cellulose film, polyvinyl alcohol film and the like. Furthermore, when operating in accordance with the principles of this invention no appreciable further conversion to interpolymer occurs after the conversion yield within the predetermined range is effected, hence the danger of further polymerization during the coagulation and purification steps is eliminated. Also the substantially automatic cut-off in conversion yield disposes of the necessity of a precise cut at a specific time interval, and insures a more uniform product.

As many modifications and changes can be made without departing from the spirit and scope of this invention, it is understood that the invention is not restricted in any way except as set forth in the appended claims.

I claim:

1. A process for preparing an organic solvent-soluble interpolymer of vinylidene chloride and acrylonitrile, which consists in dispersing 90 parts by weight of vinylidene chloride and 10 parts by weight of acrylonitrile in an aqueous medium consisting of water, sulfated methyl oleate as the dispersing agent, ammonium persulfate as catalyst, and meta sodium bisulfite as activator, the amount of catalyst and the amount of activator being so proportioned that the point $xy$, where $x$ represents the per cent by weight of ammonium persulfate based on the weight of vinylidene chloride and acrylonitrile monomer used, and $y$ represents the per cent by weight of meta sodium bisulfite, falls within the triangle ABC of Fig. 1 of the accompanying drawing, and maintaining the resulting dispersion at a temperature of 33°–35° C. under reflux, whereby to form an organic solvent-soluble interpolymer of vinylidene chloride and acrylonitrile.

2. A process for preparing an organic solvent-soluble interpolymer of vinylidene chloride and acrylonitrile which consists in dispersing a mixture of vinylidene chloride and acrylonitrile containing at least 90% by weight of vinylidene chloride in an aqueous medium consisting of water, a dispersing agent, ammonium persulfate as catalyst, and meta sodium bisulfite as activator, the amount of catalyst and the amount of activator being so proportioned that the point $xy$, where $x$ represents the per cent by weight of ammonium persulfate based on the weight of vinylidene chloride and acrylonitrile monomer used, and $y$ represents the per cent by weight of meta sodium bisulfite, falls within the triangle ABC of Fig. 1 of the accompanying drawing, and maintaining the resulting dispersion at a temperature of 33°–35° C. under reflux, whereby to form an organic solvent-soluble interpolymer of vinylidene chloride and acrylonitrile.

GILBERT PITZL.

REFERENCES CITED

The following references are of record in the file of this patent:

UNITED STATES PATENTS

| Number | Name | Date |
|---|---|---|
| 2,238,020 | Hanson | Apr. 8, 1941 |
| 2,391,218 | Bacon | Dec. 18, 1945 |
| 2,404,779 | Arnold | July 30, 1946 |
| 2,420,330 | Shriver | May 13, 1947 |
| 2,434,054 | Roedel | Jan. 6, 1948 |
| 2,462,354 | Brubaker | Feb. 22, 1949 |
| 2,474,897 | Hauser | July 5, 1949 |

FOREIGN PATENTS

| Number | Country | Date |
|---|---|---|
| 121,623 | Australia | July 11, 1946 |
| 573,369 | Great Britain | Nov. 19, 1945 |
| 622,481 | Great Britain | May 3, 1949 |

OTHER REFERENCES

Bacon, Trans. Far. Soc., April 1946, vol. 42, pages 140 to 143, 146, 147, 148, 149, and 153.

---

[1] The permeability value of a film is the number of grams of water vapor which pass through 100 square meters per hour, tested over a period of 24 hours, at approximately 39.5°±0.5° C., the relative humidity of the atmosphere at one side of the film being maintained at least at 98% and the relative humidity of the atmosphere at the other side being maintained at such a value as to give a humidity differential of at least 95%.